(12) United States Patent
Corral Rodriguez et al.

(10) Patent No.: US 9,315,224 B2
(45) Date of Patent: Apr. 19, 2016

(54) SPARE WHEEL PICKUP ASSEMBLY

(71) Applicant: BATZ, S.COOP., Igorre (ES)

(72) Inventors: Pedro Corral Rodriguez, Castro Urdiales (ES); Ekaitz Urzelai Usaola, Iurreta (ES)

(73) Assignee: Batz, S. Coop., Igorre (ES)

( * ) Notice: Subject to any disclaimer, the term of this patent is extended or adjusted under 35 U.S.C. 154(b) by 1 day.

(21) Appl. No.: 14/484,087

(22) Filed: Sep. 11, 2014

(65) Prior Publication Data

US 2015/0071746 A1   Mar. 12, 2015

(30) Foreign Application Priority Data

Sep. 11, 2013   (ES) .................................. 201331321

(51) Int. Cl.
*B62D 43/04*   (2006.01)
(52) U.S. Cl.
CPC .................................... *B62D 43/045* (2013.01)
(58) Field of Classification Search
CPC .............................. B62D 43/00; B62D 43/045
USPC .......................... 414/463; 254/323–326, 342
See application file for complete search history.

(56) References Cited

U.S. PATENT DOCUMENTS

| | | | |
|---|---|---|---|
| 2,053,976 A | 9/1936 | Stahl | |
| 2,329,943 A | 9/1943 | Robins | |
| 3,836,123 A | 9/1974 | Bausenbach | |
| 4,059,197 A | 11/1977 | Iida | |
| 4,535,973 A * | 8/1985 | Dorr et al. ...................... | 254/323 |
| 4,544,136 A | 10/1985 | Denman et al. | |
| 4,625,947 A | 12/1986 | Denman et al. | |
| 4,693,453 A | 9/1987 | Ivan | |
| 4,997,164 A | 3/1991 | Kito | |
| 5,100,106 A | 3/1992 | Denman | |
| 5,125,628 A | 6/1992 | Rempinski | |
| 5,251,877 A | 10/1993 | Rempinski et al. | |
| 5,368,280 A * | 11/1994 | Ng ................................ | 254/376 |

(Continued)

FOREIGN PATENT DOCUMENTS

| | | |
|---|---|---|
| EP | 0507032 A2 | 10/1992 |
| EP | 0635420 B1 | 1/1995 |

(Continued)

OTHER PUBLICATIONS

Extended European Search Report performed by the European Patent Office for EP Application No. 14382339.1, mailed Jan. 28, 2015, 8 pages, The Hague.

(Continued)

*Primary Examiner* — Dean Kramer

(57) ABSTRACT

Unit for picking up a spare wheel of a vehicle. According to one implementation the unit includes a gear assembly configure to apply a torque on a drum supporting a cable, the gear assembly having a cam that wobbles as the gear assembly transmits the torque. A rotatable stop is situated adjacent a side edge of the cam and is configured to act on the edge of the cam to limit the travel of the cam during the wobbling movement. The stop has a first contact surface and a second contact surface with the edge of the cam configured to slide along the first contact surface as the drum is rotated in at least one direction by operation of the cam. A guide surface is provided to interact with the second contact surface to limit the rotation of the stop when the edge of the cam acts on the stop.

20 Claims, 8 Drawing Sheets

(56) References Cited

U.S. PATENT DOCUMENTS

| | | | |
|---|---|---|---|
| 5,415,377 A | 5/1995 | Britt | |
| 6,409,454 B1 | 6/2002 | Yamamoto | |
| 6,554,253 B1 | 4/2003 | Dobmeier | |
| 6,923,394 B2 | 8/2005 | Goldstein | |
| 7,073,779 B1 * | 7/2006 | Dobmeier et al. | 254/323 |
| 7,404,545 B2 | 7/2008 | Steiner et al. | |
| 7,837,179 B2 | 11/2010 | Steiner, Jr. et al. | |
| 2004/0206849 A1 | 10/2004 | Harrington | |
| 2009/0032786 A1 | 2/2009 | Steiner, Jr. | |
| 2012/0121366 A1 | 5/2012 | Ogawa | |

FOREIGN PATENT DOCUMENTS

| | | |
|---|---|---|
| EP | 0697326 A2 | 2/1996 |
| EP | 0784006 B1 | 7/1997 |
| EP | 1352871 A2 | 10/2003 |
| ES | 1073381 U | 12/2010 |
| GB | 542849 A | 1/1942 |
| GB | 2253198 A | 9/1992 |

OTHER PUBLICATIONS

Extended European Search Report performed by the European Patent Office for EP Application No. 14382341.7, mailed Jan. 28, 2015, 6 pages, The Hague.

Spanish Written Opinion performed by the Spanish Patent Office for ES Application No. 201331321, mailed Feb. 27, 2015, 6 pages, Madrid Spain.

Partial English translation of the Spanish Written Opinion performed by the Spanish Patent Office for ES Application No. 201331321, mailed Feb. 27, 2015, 6 pages, Madrid Spain.

Spanish Written Opinion performed by the Spanish Patent Office for ES Application No. 201331326, mailed Mar. 9, 2015, 6 pages, Madrid Spain.

Partial English translation of the Spanish Written Opinion performed by the Spanish Patent Office for ES Application No. 201331326, mailed Mar. 9, 2015, 6 pages, Madrid Spain.

* cited by examiner

SPARE WHEEL PICKUP ASSEMBLY

CROSS-REFERENCE TO RELATED APPLICATIONS

This application relates to and claims the benefit and priority to Spanish Patent Application No. P201331321, filed Sep. 11, 2013.

TECHNICAL FIELD

The present invention relates to units for picking up spare wheels in vehicles.

BACKGROUND

Units for picking up spare wheels designed for use in vehicles, and more specifically units designed for picking up or releasing a spare wheel that are arranged below the chassis (or on the underbody) of the vehicle are known in the state of the art.

These units generally comprise a mechanism with a transmission shaft which allows winding or unwinding a cable when the user manipulates the transmission shaft with a tool. The transmission shaft comprises a gear assembly which allows transmitting a torque which the user produces with the tool, and a drum which allows winding or unwinding the cable and to which the torque is transmitted from the gear assembly.

The gear assembly comprises at least one cam having a toothed area, and a hole in which an eccentric shaft operated by the tool of the user is coupled. The toothed area of the cam has one tooth less than the toothed area of the drum where it is coupled or one tooth less than the toothed area of a ring gear of the gear assembly which is intermediate between the cam and the drum. When the rotation is transmitted from the gear assembly to the drum, a wobbling movement occurs in the cam, i.e., the cam swings in time with a back and forth movement caused by the action of the eccentric shaft. This wobbling movement, also known as a pilgrim movement, along with the fact that the toothed area of the cam has one tooth less than the toothed area of the drum, causes the cam to rotate and go forward one tooth of its toothed area into the teeth of the toothed area of the drum or of the ring gear. The torque is thus transmitted, but the cam also rotates, and to limit the rotation the cam comprises a prolongation abutting with an element of the unit for picking up spare wheels. According to the unit type, the stop can directly be one of the casings of the unit, or the prolongation of the cam can comprise a groove in which a bolt of the unit is located, such that the groove of the cam slides during the wobbling movement and is supported on the abutting bolt, thus preventing rotation of the cam.

European Publication No. EP1352871 A2 discloses a unit for picking up spare wheels comprising a gear assembly which allows transmitting a torque, the gear assembly comprising a cam having a wobbling movement as the gear assembly transmits the torque, and at least one stop limiting the travel of the cam during the wobbling movement.

SUMMARY OF THE DISCLOSURE

According to some implementations a unit for picking up spare wheels is provided that comprises a gear assembly which allows transmitting a torque, the gear assembly comprising a cam having a wobbling movement as the gear assembly transmits the torque, and at least one stop limiting the travel of the cam during the wobbling movement. The unit comprises at least one guide surface which interacts with a contact surface of the stop and determines the travel of the stop when the cam acts on the stop, the stop acting on the cam from one side of the cam.

The known units for picking up spare wheels have an efficiency problem in the transmission of torque which the user produces on the transmission shaft of the unit with the tool. The transmission shafts comprise a gear assembly in which during its wobbling movement, upon transmitting the torque, the cam performs a combined movement of being supported and sliding on the stop defined in the unit to limit rotation of the cam. The cam comprises a surface that is laterally supported on the stop, the surface being either one of the casings of the unit or a groove defined in the cam which is supported on a bolt. This support produces a pressure line between the edge of the support surface of the cam and the stop, and taking into account the torques that are transmitted to assure that the wheel is irreversibly fixed in place, a crushing between the edge of the surface of the cam and the stop occurs. This crushing causes difficulties in sliding the cam on the stop and torque transmission efficiency becomes worse.

According to the implementations disclosed and contemplated herein, the cam acts on the stop from one side of the cam when the cam performs the supporting and sliding movement. Since the stop is located on the side and therefore outside the cam, it can be designed with more freedom since it is not limited in an inner groove, such that the side edge of the cam can be supported not on a pressure line such as that which occurs between an edge of the cam and a bolt. Furthermore, to assure that the support between the edge of the cam and the stop is in time with the wobbling movement of the cam, the unit comprises a guide surface interacting with a contact surface of the stop other than the area of contact between the stop and the side of the cam, such that the guide surface determines the travel of the stop when the cam acts laterally on the stop during its wobbling movement.

Torque transmission efficiency in the transmission mechanism of the unit for picking up spare wheels can thus be improved through improvements in the combination of the supporting movement for supporting the cam on the stop by locating the stop on a side and by being able to freely design the stop, and of the sliding movement by introducing a contact surface in the stop which interacts with a guide surface defined in the unit.

These and other advantages and features will become evident in view of the drawings and the detailed description of the invention.

DETAILED DESCRIPTION

Figure 1:
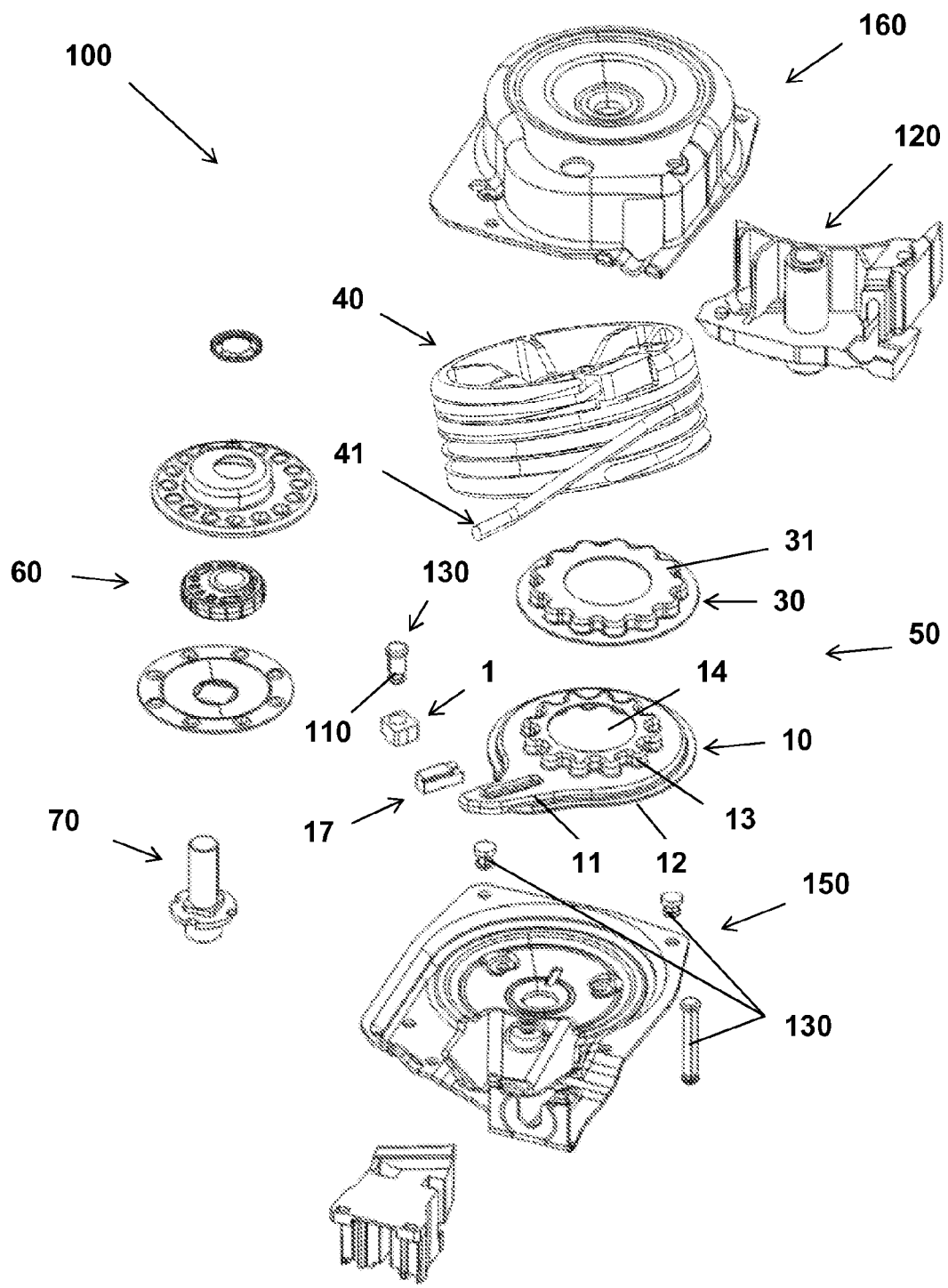
FIG. 1 shows an exploded perspective view of a first embodiment of a unit for picking up spare wheels.

FIG. 1 shows an exploded perspective view of a first embodiment of a unit for picking up spare wheels 100, the unit 100 comprising two casings, a cover casing 150 and a housing casing 160, a drum 40 which rotates for winding or unwinding a cable 41, and a gear assembly 50. The gear assembly 50, which allows transmitting the torque which a user produces (not shown in FIG. 1) by acting on a drive shaft 70 of the unit 100 with a tool, comprises in this embodiment a cam 10 and a ring gear 30. The drive shaft 70 is assembled in an eccentric assembly 60 and the eccentric assembly 60 is coupled to the gear assembly 50, the eccentric assembly 60 being assembled in a hole 14 of the cam 10. The cam 10 comprises a toothed area 13 and the ring gear 30 comprises a toothed area 31, both toothed areas 13 and 31 meshing with one another. The gear assembly 50 is coupled through the toothed area 31 of the ring gear 30 to a toothed area (not shown in FIG. 1) of the drum 40, thus allowing transmitting the torque applied by the user to the drive shaft 70 by means of the tool, and the rotation of the drum 40 in one direction or another thus being obtained.

According to some implementations the toothed area 13 of the cam 10 has one tooth less than the toothed area of the drum 40 where it is coupled and one tooth less than the toothed area 31 of the ring gear 30 of the gear assembly 50, the ring gear 30 being intermediate between the cam 10 and the drum 40. When rotation is transmitted from the gear assembly 50 to the drum 40, a wobbling movement occurs in the cam 10, i.e., the cam 10 swings in time with a back and forth movement caused by the action of the eccentric assembly 60. This wobbling movement, also known as a pilgrim movement, along with the fact that the toothed area 13 of the cam 10 has one tooth less than the toothed area of the drum 40, causes the cam 10 to rotate and move one tooth of its toothed area 13 forward into the teeth of the toothed area of the drum 40 and of the toothed area 31 of the ring gear 30, the torque thus being transmitted. The cam 10 comprises an arm 11 prolonging from the central body of the cam 10, and an edge 12 limiting the outside of the cam 10.

Figure 2:
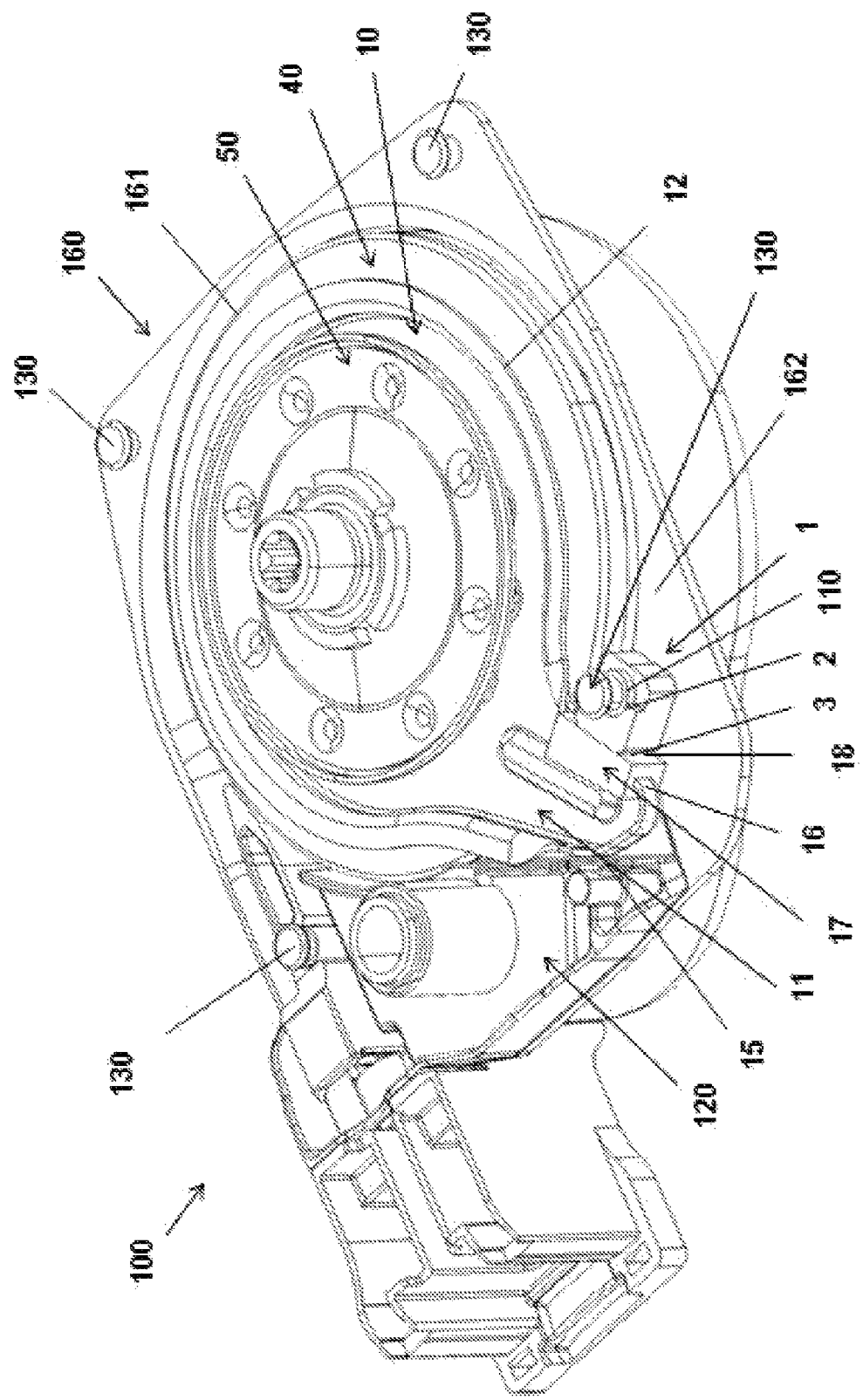
FIG. 2 shows a perspective view of the unit of FIG. 1 in which the cover casing has been removed, with a guide surface which is a pin located inside the stop of the unit.

FIG. 2 shows a perspective plan view of the unit 100 of FIG. 1 already assembled in which the cover casing 150 has been removed. The unit 100 comprises inside the housing casing 160 a housing 161 in which the drum 40 is housed, and the gear assembly 50 meshes with the drum 40. The unit 100 comprises a sliding guide 120 which is preferably made of plastic but can also be made of another material, the sliding guide 120 being assembled in the housing casing 160 inside the housing 161. The arm 11 of the cam 10 of the gear assembly 50 comprises a side 15 which is supported on and abuts with the sliding guide 120 when the wobbling movement of the cam 10 occurs while the torque is being transmitted. During its wobbling movement, the cam 10 performs a combined rotating or swinging movement and back and forth or sliding movement. To limit the cam's rotation, the side 15 of the arm 11 of the cam 10 abuts with and is supported on the sliding guide 120 when the drum 40 rotates, unwinding the cable. In the other direction of rotation, when the drum 40 is winding the cable, and therefore greater torque is transmitted for lifting the wheel and locking it in place, the arm 11 of the cam 10 abuts with another side 16, opposite the side 15, with a stop 1 arranged on a surface 162 of the casing 160 which is located at substantially the same height as the edge 12 of the cam 10. The cam 10 acts on the stop 1, being supported on a contact surface 3 of the stop 1 during its rotating movement and in sliding movement, the stop 1 limiting the travel of the cam 10.

Figure 6:
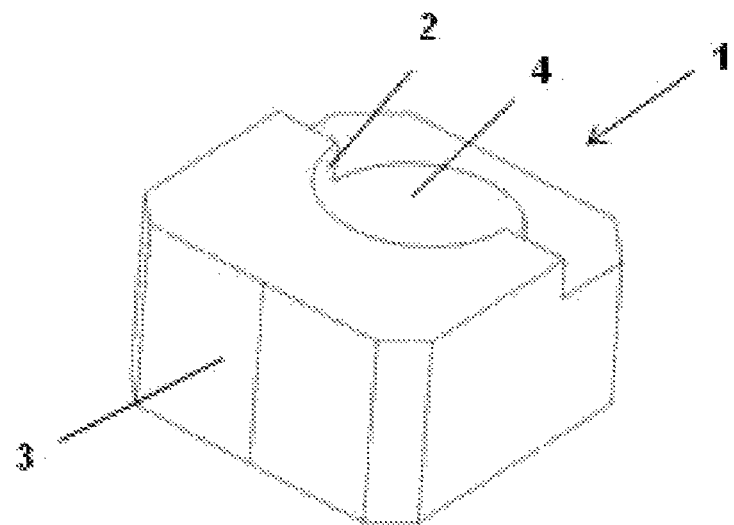
FIG. 6 shows a perspective view of the stop of the unit of FIG. 1.

The unit 100 shown in FIG. 2 also comprises a guide surface 110 which interacts with a contact surface 2 of the stop 1, the guide surface 110 allowing a rotating movement of the stop 1 accompanied by the wobbling movement of the cam 10, and limiting the travel thereof. The guide surface 110 is the substantially cylindrical outer surface of a pin which is arranged inside the stop 1. In this first embodiment, the stop 1 comprises, as shown in FIG. 6, a body having a contact surface 3 with a parallelogram shape, the contact surface 3 facing the side 16 of the arm 11 of the cam 10 and a hole 4 traversing the body of the stop 1, the axis of the hole 4 being substantially parallel to the drive shaft 70 of the unit 100 and to the contact surface 3. The pin comprising the guide surface 110 is arranged in this hole 4. The stop 1 is preferably manufactured in plastic or composite material with a low coefficient of friction, although it can also be made of metal or another material. Therefore, the support and sliding of the cam 10 through the side face 16 of the arm 11 takes place on a relatively large planar surface versus a line contact that allows it to slide without problems, improving torque transmission efficiency.

Figure 7:
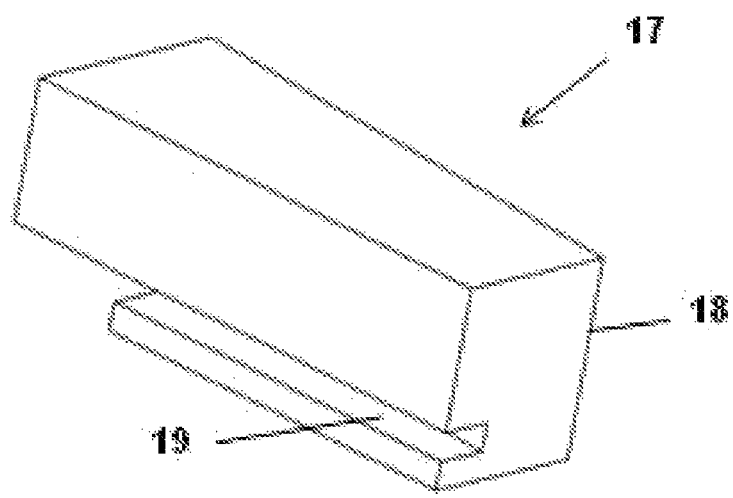
FIG. 7 shows a perspective view of the slider of the cam of the embodiments of the unit of FIGS. 2, 3 and 4.
Figure 10:
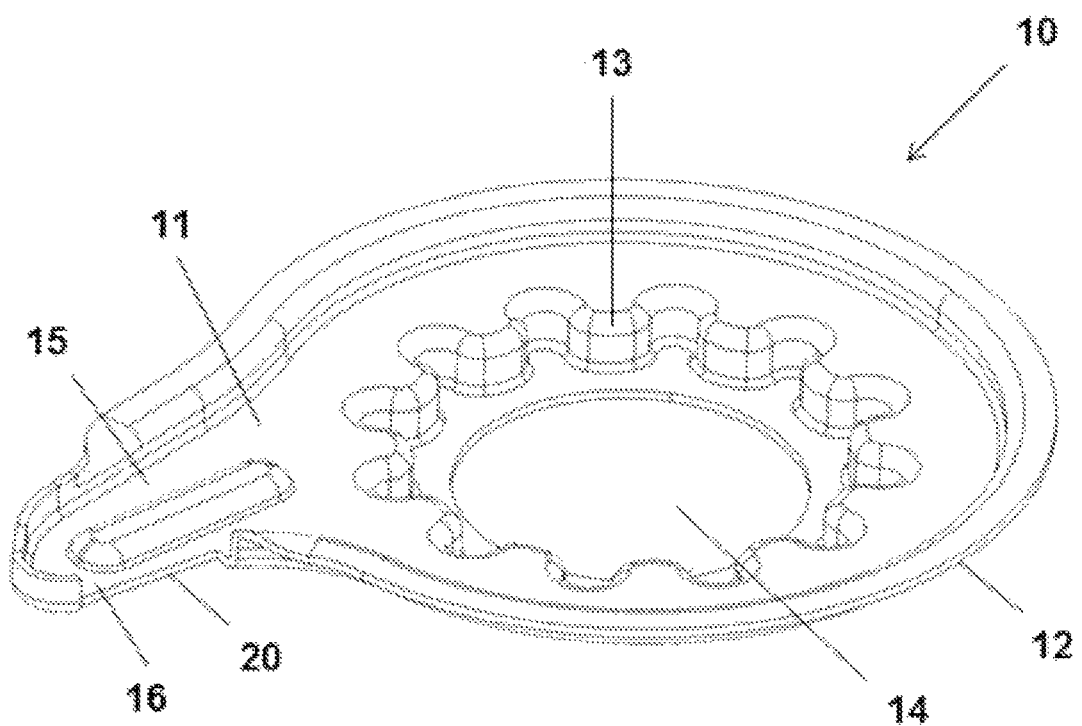
FIG. 10 shows a detailed perspective view of a cam.

The unit for picking up spare wheels 100 can work with the features described until now, but in order to further improve torque transmission efficiency, the cam 10 may further comprise, as shown in FIG. 2, a slider 17 coupled to the side 16 of the cam 10. This slider 17 comprises, as shown in FIG. 7, a body having a contact surface 18, which according to one implementation has a parallelogram shape, the contact surface 18 facing the contact surface 3 of the stop 1 which may also have a parallelogram shape. This configuration of the slider 17 of the cam 10 and of the stop 1 of the unit 100 assures that when the cam 10 acts on the stop 1 during its wobbling movement, the support during rotation and sliding takes place between two planar surfaces with sufficient support surface so that when the force derived from the transmitted torque is applied, the pressure of the cam 10 on the stop 1 decreases, and torque transmission efficiency increases significantly. The slider 17 can be coupled with the side 16 of the arm 11 of the cam 10 in different manners, the coupling shown in FIG. 2 being done by means of inserting a groove 19 of the body 17 into a section 20 of the edge 12 of the side 16. To improve the coupling of the body 17 with the side 16, the section 20 of the edge 12 of the cam 10 is reduced, as shown in a detailed view of the cam 10 in FIG. 10, such that the ends of the body 17 fit into the ends of the section 20 of the edge 12. The coupling can also be done by means of screwing, clamping, welding or another similar mode. The slider 17 is manufactured in plastic or composite material with a low coefficient of friction, although it can also be made of metal or another material. Torque transmission is therefore further improved since the contact surfaces 18 of the slider 17 and the contact surface 3 of the stop 1 have a very low coefficient of friction.

In this first embodiment of the unit 100, the cover casing 150 and the housing casing 160 are attached to one another by means of four rivets 130 having different lengths, these rivets 130 having a pin-shaped central body with a cylindrical outer surface and two heads at the ends of the central body which allow riveting between the cover casing 150 and the housing casing 160.

The guide surface 110 is the surface of the central body of one of the rivets 130 of the unit 100. This rivet 130 projects from the surface 162 of the housing casing 160, the stop 1 being able to pivot about the rivet 130. The contact surface 2 of the stop 1 is the inner surface of the hole 4 of the stop 1, the contact surface 2 of the stop 1 contacting with the guide surface 110 of the rivet 130. Therefore, when the wobbling movement of the cam 10 occurs, when the transmitted torque is for winding the cable, the contact surface 18 of the slider 17 of the cam 10 is supported and slides on the contact surface 3 of the stop 1, and this stop 1 accompanies this supporting and sliding movement by rotating about the rivet 130 which is in contact with the stop 1, the contact surface 2 of the stop 1 being supported on the guide surface 110 of the rivet 130, the guide surface 110 limiting the travel of the stop 1.

The dimension of the rivet 130 performing the function of a pin in contact with the stop 1 is in accordance with the dimension of the unit 100 and with the need of the torque to be transmitted from the drive shaft 70 to the drum 40. The rivets 130 of the unit 100 can be replaced by bolts with a cylindrical central body and a threaded end section allowing the threaded attachment of the cover casing 150 and of the housing cover 160. One of the threaded bolts would be located inside the stop 1, traversing the hole 4, and comprising the guide surface 110. Other similar attachment elements can be used to perform the same function. Therefore, the guide surface 110 is obtained, without adding more elements to the unit 100, by making one of the rivets 130 project from the surface 162 of the housing casing 160, the surface of the central body of the projecting rivet 130 forming the guide surface 110.

Since the stop 1 is located on the side and therefore outside the cam 10, it can be designed with more freedom, such that the side 16 of the cam 10 acting on the stop 1 can be supported not on a pressure line such as that which occurs between an edge of the cam and a bolt, but in a space demarcated by a planar contact surface 18 of the slider 17 of the cam 10 and a planar contact surface 3 of the stop 1 in which it is supported.

In another embodiment (not shown in the drawings), the cam 10 comprises a second slider with the same features as the slider 17 of the cam 10 of the unit 100 of FIG. 7, this second slider being coupled to the side 15 of the arm 11 of the cam 10, and a contact surface of this second slider of the cam 10 being supported, in the direction of rotation of the unit 100 for unwinding the cable from the drum 40, on a contact surface of the second stop of the unit 100 during rotation supporting movement and sliding movement of the cam 10. The coupling of the second slider of the cam 10 to the side 15 has the same features as the coupling of the slider 17 with the cam 10 shown in FIGS. 2, 7 and 10. Therefore, if the unit 100 comprises a second slider of the cam 10, a second stop, and a second guide surface of the unit 100, the support and sliding of the bodies during the wobbling movement of the cam 10 when the cable is unwound is similar to that described above for the wobbling movement of the cam 10 when the cable is wound, although the torque transmitted in this second case is less.

Figure 3:
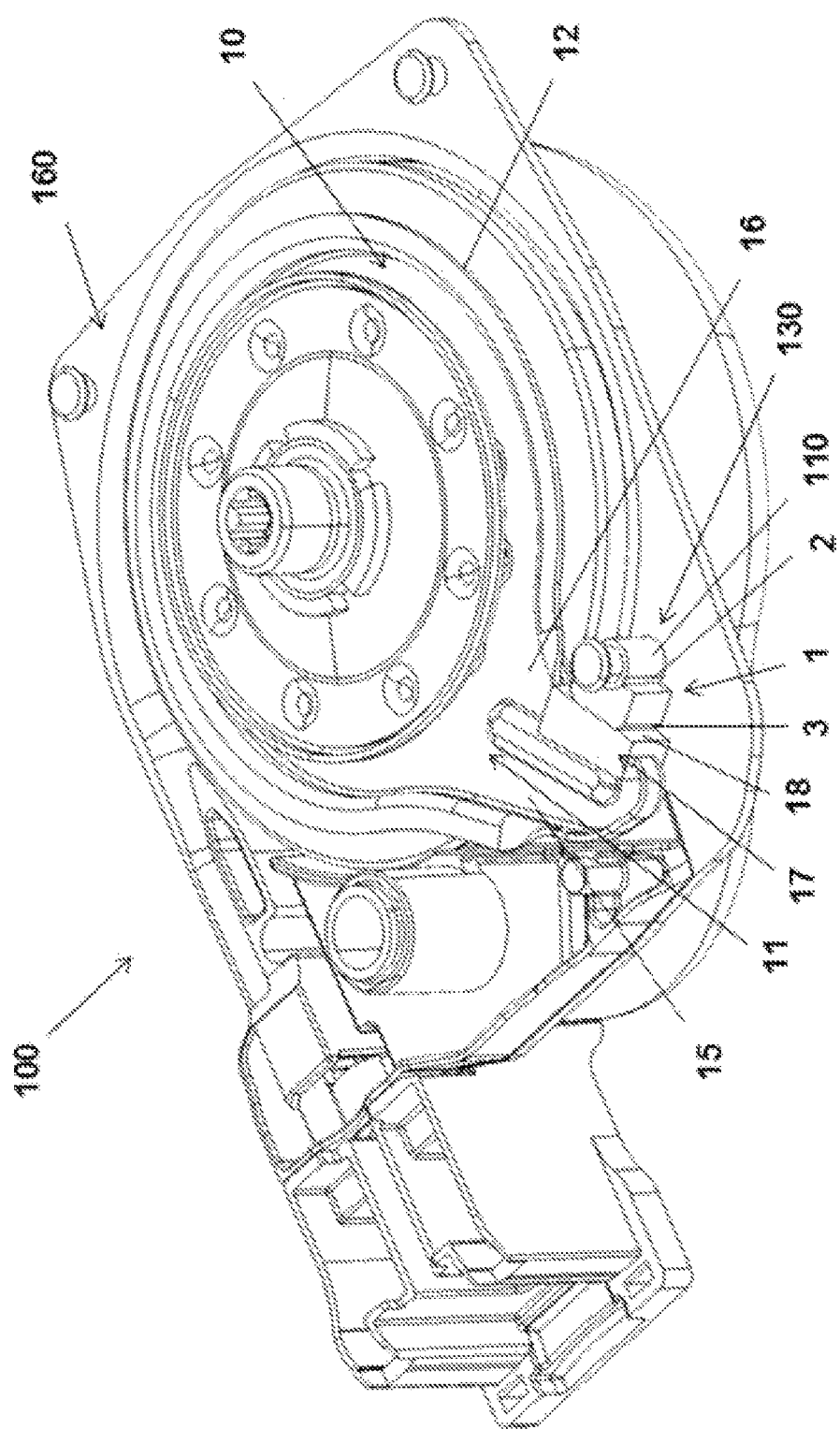
FIG. 3 shows a perspective view of a second embodiment of a unit for picking up spare wheels in which the cover casing has been removed, with a guide surface which is a pin located outside the stop of the unit.
Figure 8:
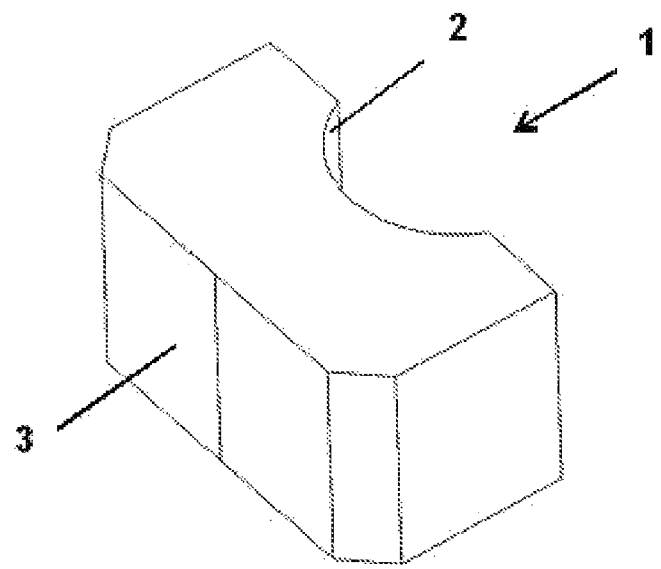
FIG. 8 shows a perspective view of the stop of the unit of FIG. 3.

FIG. 3 shows a perspective view of a second embodiment of the unit 100 of the invention, the configuration of which is similar to the unit 100 of the first embodiment shown in FIGS. 1 and 2, and in which the casing 150 has been removed. This second embodiment of the unit 100 has the same features as the unit 100 of FIGS. 1 and 2, with the difference that in this second embodiment the guide surface 110 is also the substantially cylindrical surface of the central body of a pin coinciding with one of the rivets 130 of the unit 100, but the pin is located outside the stop 1 of the unit 100. The stop 1 of this second embodiment of the unit 100, as shown in FIG. 8, is therefore similar to the stop 1 of the first embodiment of the unit 100, the contact surface 2 of the stop 1 in this second embodiment being a circular surface located on the surface of the stop 1 opposite the contact surface 3, and with the same radius as the cylindrical body the guide surface 110 is part of, the contact surface 2 of the stop 1 being supported on the guide surface 110 of the rivet 130 located close to the stop 1.

In another embodiment of the unit 100 (not shown in the drawings), similar to the first and second embodiments of the unit 100 shown in FIGS. 2 and 3, the guide surface 110 is not the surface of the central body of one of the rivets 130 joining the cover casing 150 and the housing casing 160 of the unit 100, but rather is the side surface of an independent bolt of the rivets 130 which is fixed to one of the casings 150 or 160, or to both.

In other embodiments similar to the first and second embodiments of the unit 100, the pin comprising the guide surface 110 is formed on the surface of one of the casings of the unit 100, either the cover casing 150 or the housing casing 160.

Figure 4:
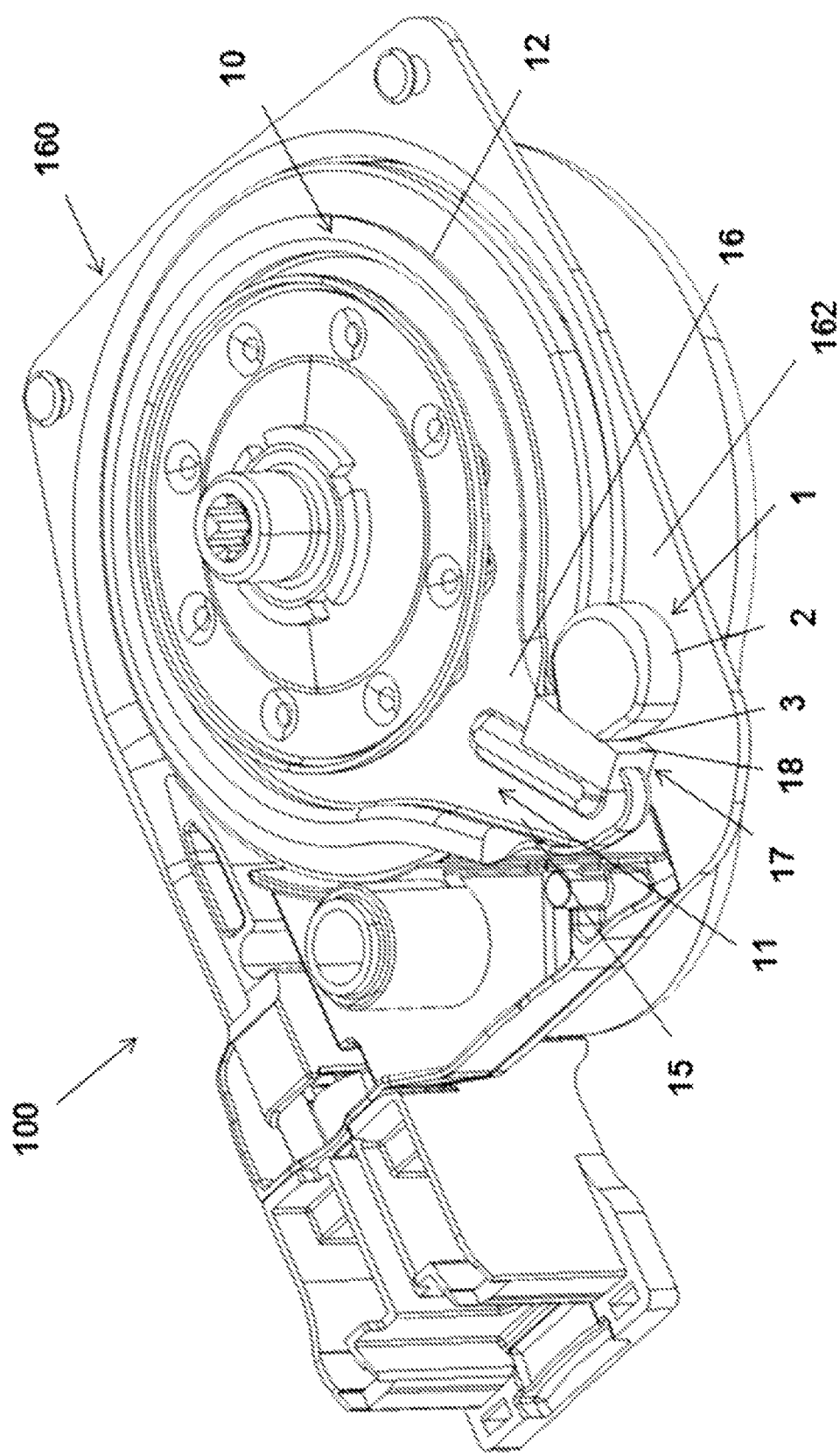
FIG. 4 shows a perspective view of a third embodiment of a unit for picking up spare wheels in which the cover casing has been removed.
Figure 5:
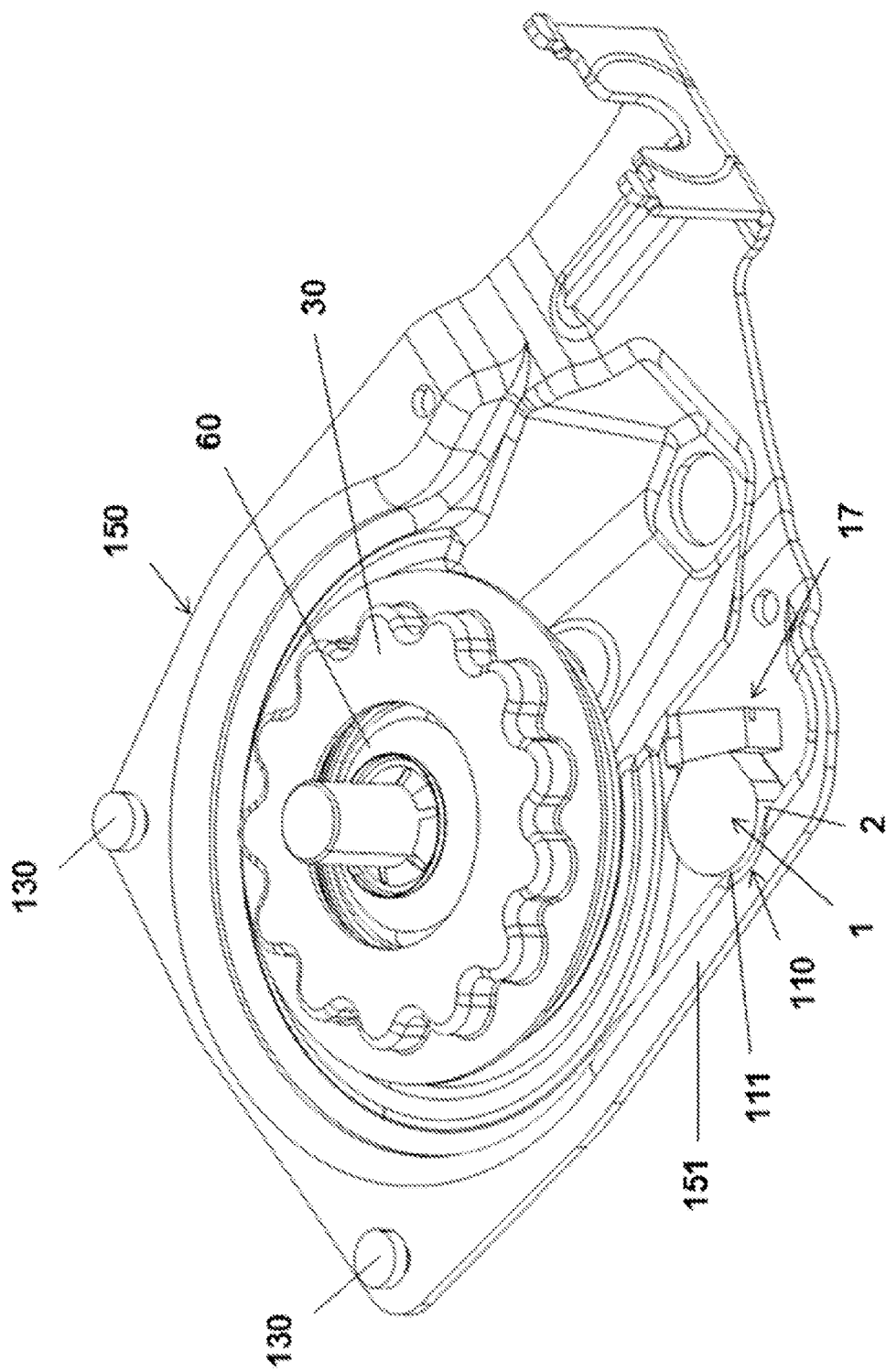
FIG. 5 shows a perspective view of the cover casing of the unit of FIG. 4 with the ring gear and the eccentric assembly of the unit already assembled, with a guide surface located outside the stop of the unit and formed in the cover casing, the guide surface being in contact with the stop of the unit, and the slider of the cam being in contact with the stop of the unit.
Figure 9:
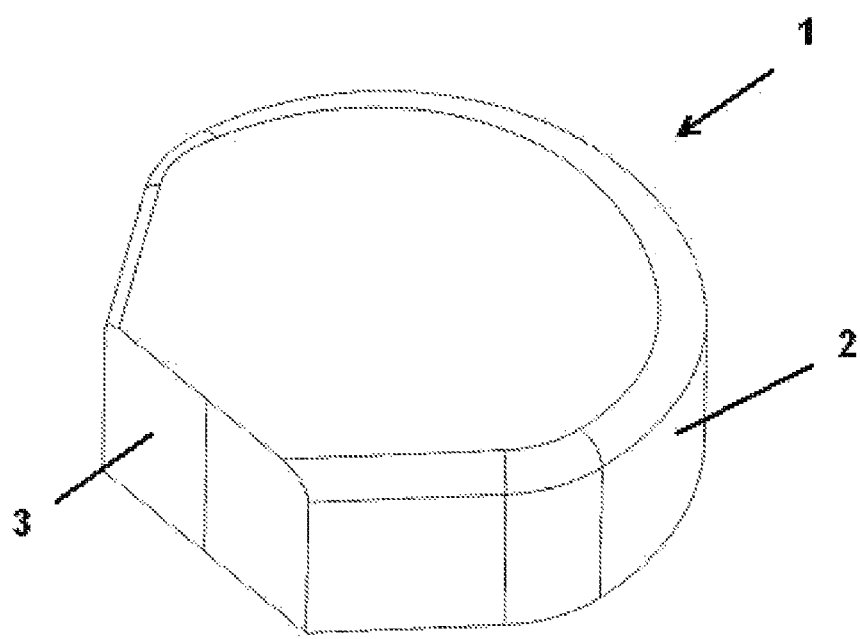
FIG. 9 shows a perspective view of the stop of the unit of FIG. 4.

FIG. 4 shows a perspective view of a third embodiment of the unit for picking up spare wheels 100 in which the cover casing 150 has been removed. FIG. 5 shows a perspective view of the cover casing 150 of the unit 100 of FIG. 4 with the ring gear 30 and the eccentric assembly 60 of the unit 100 already assembled, with a guide surface 110 located outside the stop 1 of the unit 100 and formed in the cover casing 150, the guide surface 110 being in contact with the stop 1 of the unit 100, and the slider 17 of the cam 10 being in contact with the stop 1 of the unit 100. This third embodiment of the unit 100 has the same features as the unit 100 of the first and second embodiments shown in FIGS. 1, 2 and 3, with the difference that in this third embodiment the guide surface 110 is not a pin, but rather is formed on the surface of the cover casing 150 and has a substantially circular shape. The stop 1 of this third embodiment of the unit 100 therefore comprises, as shown in FIG. 9, a body having a contact surface 3 with a parallelogram shape, the contact surface 3 facing the side 16 of the arm 11 of the cam 10, and a contact surface 2 having a substantially circular shape and located opposite the contact surface 3. This contact surface 2 has a radius substantially equal to the radius of the guide surface 110, the contact surface 2 of the stop 1 being in contact with the guide surface 110, this contact allowing the stop 1 to accompany the wobbling movement of the cam 10 and limiting its travel.

In this third embodiment, the guide surface 110 of the unit 100 is a surface generated by stamping on a surface 151 of the cover casing 150. This guide surface 110 comprises a wall 111 that is substantially vertical with respect to the surface 151, the wall 111 having an at least partially circular shape which is adapted to the contact surface 2 of the stop 1. When the stop 1 is assembled on the surface 151 of the cover casing 150, it is trapped between the side 16 of the arm 11 of the cam 10 and the guide surface 110. Obviously, the guide surface 110 can be formed in the housing casing 160.

In any of the embodiments, the stop 1 and slider 17 are preferably manufactured in plastic or composite material with a low coefficient of friction, although they can also be made of metal or another material.

What is claimed is:
1. A unit for picking up a spare wheel of a vehicle, the unit comprising:

a cable that supports and determines the vertical disposition of the spare wheel, a drum onto which the cable is wound, the drum rotatable in a first direction to at least partially unwind the cable from the drum to effectuate a lowering of the spare wheel, the drum rotatable in a second direction opposite the first direction to effectuate a raising of the spare wheel, a gear assembly configured to apply a torque on the drum to cause the drum to rotate in either the first or second directions, the gear assembly comprising a cam having a wobbling movement as the gear assembly transmits the torque, a rotatable stop situated adjacent a side edge of the cam and configured to act on the edge of the cam to limit the travel of the cam during the wobbling movement, the stop having a first contact surface and second contact surface, the edge of the cam configured to slide along the first contact surface as the drum is rotated in the second direction by operation of the cam; and a guide surface configured to interact with the second contact surface of the stop to limit the rotation of the stop when the edge of the cam acts on the stop.

2. A unit according to claim 1, wherein the cam comprises an arm having a first side and a second side.

3. A unit according to claim 2, further comprising a slider coupled to the first side of the arm, the slider having a contact surface which is supported and slides on the first contact surface of the stop.

4. A unit according to claim 3, wherein the contact surface of the slider is substantially planar.

5. A unit according to claim 1, wherein the first contact surface of the stop is substantially planar.

6. A unit according to claim 5, wherein at least a portion of the second contact surface of the stop is non-planar.

7. A unit according to claim 1, further comprising a slider coupled to the edge of the cam, the slider having a contact surface which is supported and slides on the first contact surface of the stop.

8. A unit according to claim 7, wherein the contact surface of the slider is substantially planar.

9. A unit according to claim 7, wherein the slider of the cam is made of a material having a low coefficient of friction.

10. A unit according to claim 9, wherein the stop is made of material having a low coefficient of friction.

11. A unit according to claim 10, further comprising a cover casing and a housing casing forming a housing in which the cam is located, the guide surface being a surface of at least one of the cover casing and housing casing.

12. A unit according to claim 1, further comprising a cover casing and a housing casing forming a housing in which the cam is located, the stop being arranged on the cover casing, the guide surface being arranged on a surface of the cover casing.

13. A unit according to claim 1, further comprising a cover casing and a housing casing forming a housing in which the cam is located, the stop being arranged on the housing casing, the guide surface being arranged on a surface of the housing casing.

14. A unit according to claim 1, wherein the guide surface is located outside the stop.

15. A unit according to claim 1, wherein the guide surface is located inside the stop.

16. A unit according to claim 1, further comprising a cover casing and a housing casing forming a housing in which the cam is located, the guide surface being a surface of at least one of the cover casing and housing casing.

17. A unit according to claim 1, further comprising a cover casing and a housing casing forming a housing in which the cam is located, the guide surface being a pin attached to at least one of the cover casing and housing casing.

18. A unit according to claim 1, further comprising a cover casing and a housing casing forming a housing in which the cam is located, the cover casing and housing casing being attached by a plurality of rivets, one of the plurality of rivets comprising the guide surface.

19. A unit according to claim 1, wherein the stop is made of material having a low coefficient of friction.

20. A unit according to claim 19, further comprising a cover casing and a housing casing forming a housing in which the cam is located, the guide surface being a surface of at least one of the cover casing and housing casing.

* * * * *